US011783340B2

(12) United States Patent
Goodsitt et al.

(10) Patent No.: US 11,783,340 B2
(45) Date of Patent: *Oct. 10, 2023

(54) LOCALIZED ACCOUNT FREEZE FOR FRAUDULENT TRANSACTIONS

(71) Applicant: Capital One Services, LLC, McLean, VA (US)

(72) Inventors: Jeremy Goodsitt, Champaign, IL (US); Vincent Pham, Seattle, WA (US); Fardin Abdi Taghi Abad, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,569

(22) Filed: Dec. 15, 2022

(65) Prior Publication Data

US 2023/0123216 A1 Apr. 20, 2023

Related U.S. Application Data

(63) Continuation of application No. 16/843,355, filed on Apr. 8, 2020, now Pat. No. 11,551,228.

(51) Int. Cl.
G06Q 20/40 (2012.01)
H04W 4/029 (2018.01)
G06N 20/00 (2019.01)

(52) U.S. Cl.
CPC ........ *G06Q 20/4016* (2013.01); *G06N 20/00* (2019.01); *H04W 4/029* (2018.02)

(58) Field of Classification Search
None
See application file for complete search history.

(56) References Cited

U.S. PATENT DOCUMENTS 11,551,228 B2 * 1/2023 Goodsitt .............. G06Q 20/202

* cited by examiner

*Primary Examiner* — Quoc D Tran
(74) *Attorney, Agent, or Firm* — Perkins Coie LLP

(57) ABSTRACT

Computer-implemented methods and systems are provided for locally freezing a user account in a geographic or digital space. Consistent with disclosed embodiments, locally freezing a user account in a geographic or digital space includes receiving fraud data associated with the user account, the fraud data including a location where a fraud associated with the user account has occurred, wherein the fraud location includes at least one of a digital location or a geographical location; receiving account data associated with the user account, the account data including non-fraudulent account transaction information; generating a pattern of fraud based on the fraud data; generating a pattern of use associated with the user account based on the account data; determining a geodigital area for a localized account freeze based on the pattern of fraud and the pattern of use; and performing a localized account freeze on the user account based on the determined geodigital area.

20 Claims, 5 Drawing Sheets

LOCALIZED ACCOUNT FREEZE FOR FRAUDULENT TRANSACTIONS

CROSS-REFERENCE TO RELATED APPLICATION(S)

This application is a continuation of U.S. patent application Ser. No. 16/843,355, filed Apr. 8, 2020. The content of the foregoing application is incorporated herein in its entirety by reference.

TECHNICAL FIELD

The disclosed embodiments concern localized account freezes in a geographic or digital space using machine learning systems. More specifically, the disclosed embodiments concern neural network systems that use machine learning for determining fraudulent and nonfraudulent patterns and performing a localized account freeze based on those patterns.

BACKGROUND

Electronic data transfers often fall victim to fraud due to identity theft, data breaches, or otherwise insecure systems. When potential fraud occurs, financial service providers may ask the user whether fraud has occurred and/or completely deactivate the account. When a user is asked whether fraud has occurred, there may be a delay in the response, providing time for further fraudulent activity. Alternatively, if the user's account is compromised by a fraudster, the fraudster may have access to the user account and indicate that no fraud has occurred while continuing the fraudulent activity.

If the user's account is completely deactivated, a user may lose access to their card even when the fraud occurred electronically or very far away.

Accordingly, improved systems are needed for identifying fraudulent electronic data transactions and applying intelligent rules for freezing a user account to reduce computer system load, improve system efficiency, and enhance electronic data security.

SUMMARY

Consistent with disclosed embodiments, there is provided a method performed by at least one processor for locally freezing a user account in a geographic or digital space. The method includes: receiving fraud data associated with the user account, the fraud data including a location where a fraud associated with the user account has occurred, wherein the fraud location may comprise at least one of a digital location or a geographical location; receiving account data associated with the user account, the account data including nonfraudulent account transaction information; generating a pattern of fraud based on the fraud data; generating a pattern of use associated with the user account based on the account data; determining a geodigital area for a localized account freeze based on the pattern of fraud and the pattern of use; and performing a localized account freeze on the user account based on the determined geodigital area.

Also consistent with disclosed embodiments, there is provided a system for locally freezing a user account in a geographic or digital space. The system includes: at least one processor and at least one non-transitory computer readable medium containing instructions that, when executed by the at least one processor, cause the processor to perform operations. The operations include receiving fraud data associated with the user account, the fraud data including a location where a fraud associated with the user account has occurred, wherein the fraud location comprises at least one of a digital location or a geographical location; receiving account data associated with the user account, the account data including non-fraudulent account transaction information; receiving account data associated with the user account, the account data including non-fraudulent account transaction information; generating a pattern of fraud based on the fraud data; generating a pattern of use associated with the user account based on the account data; determining a geodigital area for a localized account freeze based on the pattern of fraud or the pattern of use; and performing a localized account freeze on the user account based on the determined area.

Further consistent with disclosed embodiments, there is provided an authorization server including at least one processor and at least one non-transitory computer readable medium. The non-transitory computer readable medium contains instructions that, when executed by the at least one processor, cause the authorization server to perform operations including: receiving fraud data associated with the user account from a first system, the fraud data including a location where a fraud associated with the user account has occurred, wherein the fraud location comprises at least one of a digital location or a geographical location; generating a pattern of fraud based on the fraud data; generating a pattern of use associated with the user account based on the account data; determining a geodigital area for a localized account freeze based on the pattern of fraud and the pattern of use; and providing the geodigital area for a localized account freeze to the first system.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments disclosed herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

In order to overcome the deficiencies of prior art, it is necessary to apply intelligent algorithms for determine how and where to perform a local account freeze. The goal of the account freeze is to allow a user to continue to use their account while simultaneously disallowing future fraudulent transactions. Consistent with the present disclosure, intelligent algorithms are applied to determine patterns from large amounts of data. For example, intelligent algorithms may be applied to determine transactions associated with a user and transactions which may be associated with fraud.

In the modern era of digital transactions, an account freeze cannot simply be geographical in nature but must also take into consideration a wide assortment of potential online transactions which may not be fixed to a physical location. Therefore, in order to provide a system which may accurately and intelligently perform a local account freeze, the account freeze should be capable of being performed not only in a geographical area but also in a digital space. Accordingly, the scope of account freeze disclosed herein is referred to as a geodigital area and potentially encompasses either a given geographical area or a digital space, or both a geographical area and a digital space.

For the purposes of the present disclosure, a digital space may be associated with certain websites and types of transactions as well as a variety of other factors. For example, a digital space could be associated with a website such as Amazon.com or types of online transactions such as purchasing model trains. By separating transactions into these digital spaces, a user is able to continue with their normal pattern of purchasing while avoiding potentially fraudulent transactions on their account.

Figure 1:
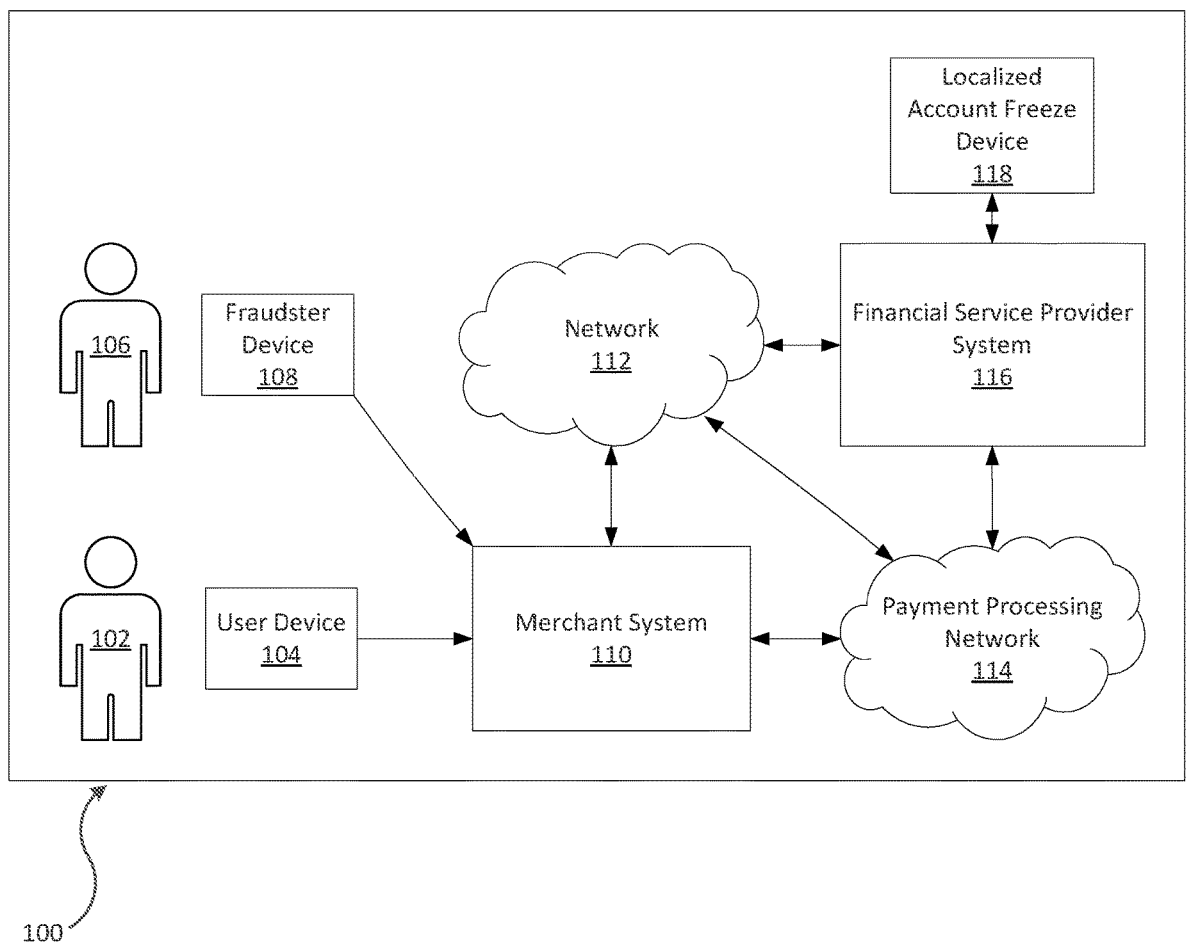
FIG. 1 depicts an exemplary environment for a localized account freeze implemented upon detecting a fraudulent transaction.

FIG. 1 depicts an exemplary environment 100 for a localized account freeze implemented upon detecting a fraudulent transaction, consistent with disclosed embodiments. Environment 100 may include a user 102, a user device 104, a fraudster 106, a fraudster device 108, a merchant system 110, a network 112, a payment processing network 114, a financial service provider system 116, and a localized account freeze device 118. In some embodiments, localized account freeze device 118 may be configured to locally freeze a user account associated with user 102 based on data received from another element of environment 100 such as user device 104, merchant system 110, network 112, payment processing network 114, financial service provider system 116, or another system. In some embodiments, localized account freeze device 118 may be configured to authorize an electronic transaction occurring at merchant system 110 or at another system. Such electronic transactions may be authorized using fraud data and account data associated with an account associated with user 102 and user device 104. The fraud data and account data may be received from user device 104, merchant system 110, financial service provider system 116, or another system. Merchant system 110 may be configured to request authorization of an electronic transaction from financial service provider system 116, localized account freeze device 118, or another system. The elements of environment 100 may be configured to communicate over network 112. As would be recognized by one of skill in the art, the depiction of environment 100 in FIG. 1 is not intended to be limiting. In some embodiments, additional elements may be added, and/or the depicted elements of environment 100 may be combined, divided, modified, or removed. For example, envisioned embodiments may implement a superset or a subset of the depicted elements of system 100.

In some embodiments, fraudster 106 is a person or entity associated with fraudster device 108 that initiates a financial transaction associated with user 102 and user device 104 using merchant system 110. Localized account freeze device 118 may be configured to freeze an account associated with user 102 and user device 104 for any future transactions initiated by fraudster 106 using fraudster device 108 while allowing future transactions by user 102 using user device 104.

Localized account freeze device 118 may be configured to locally freeze an account associated with user 102 and user device 104 based on fraud data and account data, consistent with disclosed embodiments. Localized account freeze device 118 may include one or more computing devices, such as servers, workstations, desktop computers, or special-purpose computing devices. In some embodiments, localized account freeze device 118 may be implemented using a parallel computing environment, such as the MapReduce architecture described in "MapReduce: Simplified Data Processing on Large Clusters," by Jeffrey Dean and Sanjay Ghemawat, (Dean, J. and Ghemawat, "MapReduce: Simplified data processing on large clusters"; Sixth Symposium on Operating System Design and Implementation; San Francisco, Calif.; 2004) or the Spark architecture described in "Spark: Cluster Computing with Working Sets," by Matei Zaharia, Mosharaf Chowdhury, Michael J. Franklin, Scott Shenker, and Ion Stoica, (Zaharia, M., Chowdhury M., Franklin M., Shenker S., and Stoica I., "Spark: Cluster Computing with Working Sets"; IEEE International Conference on Cloud Computing Technology and Science; Berkeley, Calif.; 2010) each of which is incorporated herein by reference in its entirety. Localized account freeze device 118 is not limited to a specific parallelization technology, job scheduler (e.g., YARN or Mesos), programming language, parallel computing environment, or parallel computing environment communications protocol. For example, localized account freeze device 118 may be implemented in scientific computing clusters, databases, cloud-based computing environments, and ad-hoc parallel computing environments (e.g., SETI at home or the like). In such a parallel computing environment, localized account freeze device 118 may be implemented as a collection of logical nodes. In some aspects, these logical nodes may include controller, mapper, and reducer nodes, as would now be recognized by one of skill in the art. These logical nodes may be implemented using servers, workstations, desktops, graphics cards, videogame systems, embedded systems, or other computing devices according to systems and methods known by one of skill in the art.

Localized account freeze device 118 may be standalone, or it may be part of a subsystem, which may be part of a larger system. For example, localized account freeze device 118 may be associated with a financial institution, such as a bank (not shown). Localized account freeze device 118 may include distributed servers that are remotely located, and may communicate with other systems of the financial institution over a public network, or over a dedicated private network.

Figure 2:
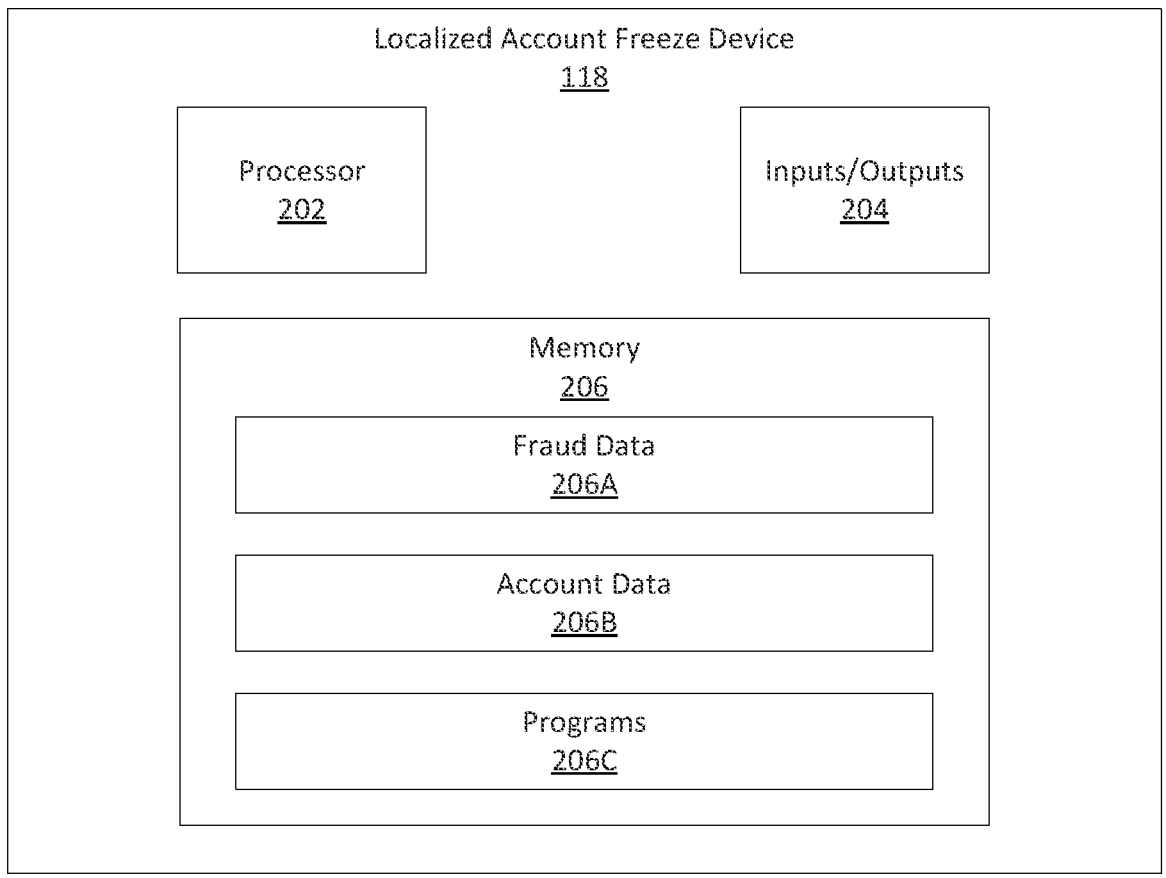
FIG. 2 depicts a schematic illustrating an exemplary device for localized account freeze upon detecting a fraudulent transaction.

As described in greater detail with regard to FIG. 2, a memory 206 may be configured to store data and instructions used to locally freeze an account associated with a user 102 and a user device 104. In certain aspects, when executed by the one or more computing devices implementing localized account freeze device 118, the instructions may cause localized account freeze device 118 to perform various disclosed operations. As a non-limiting example, the instructions may cause localized account freeze device 118 to locally freeze an account associated with a user 102 and a user device 104.

Merchant system 110 may comprise a system for collecting payment information, consistent with disclosed embodiments. Merchant system 110 may include one or more computing systems, such as servers, general purpose computers, or mainframe computers. For example, Merchant system 110 may comprise one or more point-of-sale terminals, automated teller machines, check verification systems, credit card processing systems, or similar systems. Merchant system 110 may be standalone, or it may be part of a subsystem, which may be part of a larger system. For example, merchant system 110 may be associated with a business institution. As a non-limiting example, the business institution may be a manufacturer, distributor, wholesaler, retailer, service provider, or other commercial entity. As would be recognized by one of skill in the art, the nature of the business institution is not intended to be limiting. Merchant system 110 may include distributed servers that are remotely located, and may communicate with other systems of the business institution over a public network, or over a dedicated private network.

Network 112 may be configured to provide communications between components of FIG. 1. For example, network 112 may be any type of network (including infrastructure) that provides communications, exchanges information, and/or facilitates the exchange of information, such as the Internet, a Local Area Network, or other suitable connection (s) that enables certain components of environment 100 to send and receive information between the components of environment 100.

FIG. 2 depicts a schematic illustrating an exemplary device for localized account freeze device 118 upon detecting fraudulent transaction, consistent with disclosed embodiments. Localized account freeze device 118 may comprise a processor 202, inputs and outputs 204, and a memory 206. Memory 206 may be configured to store one or more computer programs, applications, software, firmware, or other instructions (not shown) executable for locally freezing a user account.

Memory 206 may be implemented using one or more non-transitory computer memories. In various aspects, memory 206 may comprise one or more hard disk drives, solid state drives, random access memories, or similar non-transitory computer memories. In some aspects, memory 206 may be implemented using a distributed file system, such as Hadoop Distributed File System, GlusterFS, Parallel Virtual File System, Google File system, Moose File System, or another distributed file system enabling distributed storage, modification, and retrieval of data across a cluster, arrangement, or collection of computing devices.

In some embodiments, memory 206 may be configured to store fraud data 206A and account data 206B. In some aspects, fraud data 206A and account data 206B may each comprise one or more electronic transactions. In various aspects electronic transactions may comprise electronic transaction components. Electronic transaction components may include at least one of a merchant identifier, a customer identifier, date (e.g., day-of-week, day-of-month, and/or day-of-year), a time, an electronic transaction amount, an electronic transaction location, and any other electronic transaction feature recognized by one of skill in the art. Electronic transaction components may be discrete-valued (e.g., merchant identifier, date), or continuous-valued (e.g., amount, time).

In some embodiments, fraud data 206A may be previously received and stored or fraud data 206A may be received through inputs and outputs 204 when localized account freeze device 118 or another device determines that fraudulent activity has occurred.

In some embodiments, fraud data 206A may comprise data from the fraudulent activity that initially caused the localized account freeze as well as fraud data associated with prior fraudulent transactions on the user account associated with user 102 as well as prior fraudulent transactions associated with other user accounts.

In some embodiments, account data 206B may be previously received and stored or account data 206B may be received through inputs and outputs 204 when localized account freeze device 118 or another device determines that fraudulent activity has occurred.

In some embodiments, account data 206B may comprise data associated with prior nonfraudulent transactions on the user account associated with user 102 as well as prior nonfraudulent transactions associated with other similar user accounts.

Figure 3A:
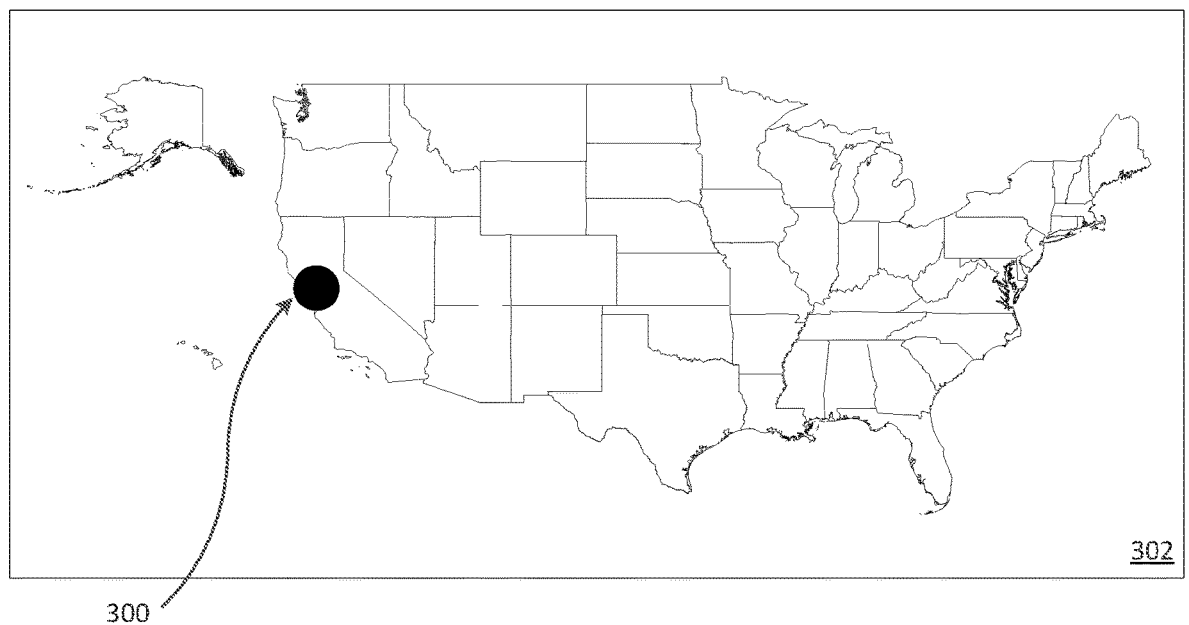
FIGS. 3A and 3B depict geographical models of a localized account freeze implemented upon detecting fraudulent transaction.
Figure 3B:
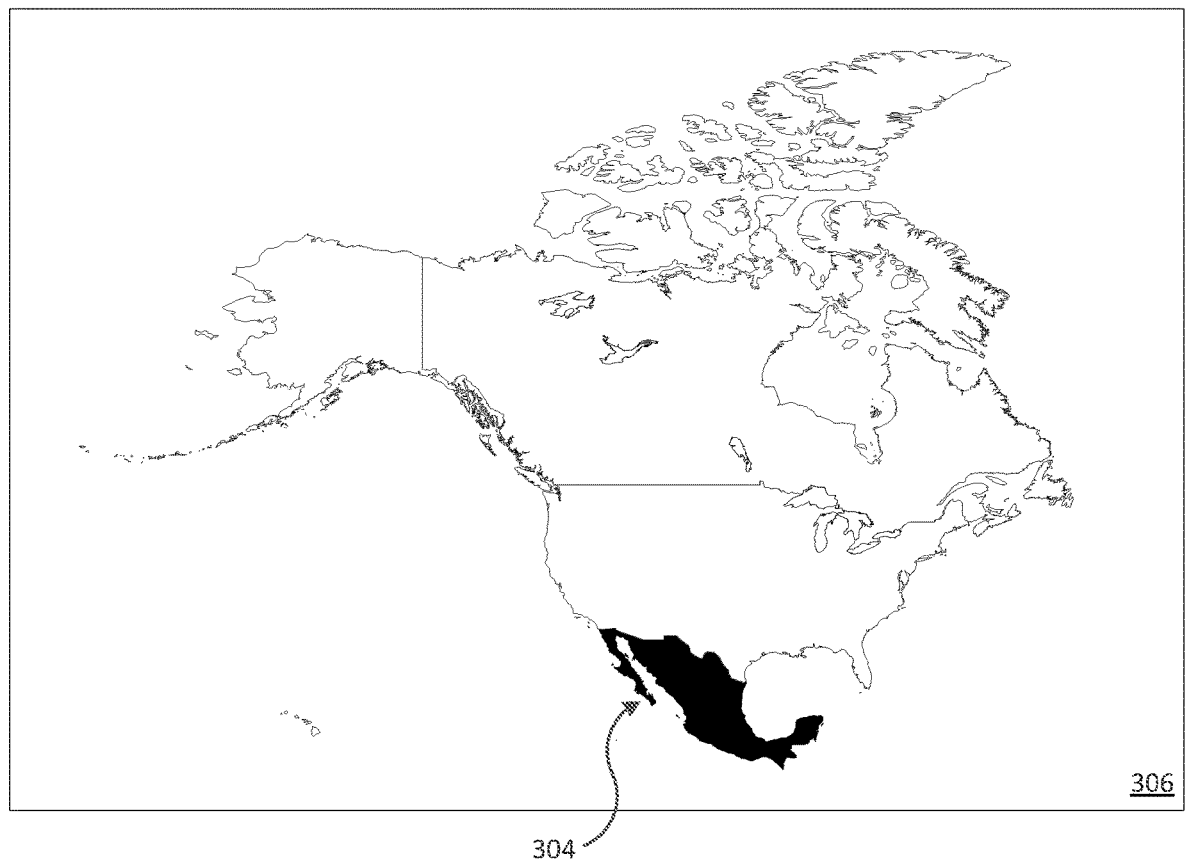

FIGS. 3A and 3B depict geographical models of a localized account freeze implemented upon detecting a fraudulent transaction. For example, FIG. 3A depicts a map of the United States 302 and a black-out zone 300. Black-out zone 300 may comprise a localized area where an account is frozen or unfrozen, consistent with disclosed embodiments. Likewise, referring also to FIG. 3B, a black-out zone 304 may comprise a country or locality where an account is frozen or unfrozen.

In some embodiments, black-out zone 300 may comprise an area encompassing where user data indicates a user frequently makes electronic transactions. Localized account freeze device 118 may generate a user pattern using account data 206B. In some embodiments, the user pattern may correlate with a geographical area such as black-out zone 300. Therefore, if there has been fraud on a user account, localized account freeze device 118 may locally unfreeze electronic transactions corresponding to black-out zone 300 thereby allowing the user to continue making electronic transactions in the immediate area while freezing their account for electronic transactions outside of black-out zone 300.

In some embodiments, black-out zone 300 may comprise an area encompassing where fraud data indicates a fraudster makes electronic transactions. Localized account freeze device 118 may generate a pattern of fraud based on fraud data 206A. In some embodiments, the pattern of fraud may correlate with a geographical area such as black-out zone 300. Therefore, if there has been fraud on a user account, localized account freeze device 118 may locally freeze electronic transactions corresponding to black-out zone 300, thereby allowing the user to continue making electronic transactions while freezing their account for electronic transactions coming from the known fraud area of black-out zone 300.

In some embodiments, as a non-limiting example, black-out zone 300 may be a neighborhood, municipality, state, or country. For example, a user account may be unfrozen in a given square mile radius of an average geographical location where the user is known to make electronic transactions. In some embodiments, a user account may be unfrozen according to the boundaries of a geographical area consistent with the user's patterns of electronic transaction for a given amount of time. The black-out zone need not be a circle or even correspond to any common geometric shape and may differ drastically from one local account freeze to another local account freeze and from user to user.

Referring to FIG. 3B, in some embodiments, black-out zone 304 may correspond to a country or locality where user data indicates a user frequently makes electronic transactions. Localized account freeze device 118 may generate a user pattern using account data 206B. In some embodiments, the user pattern may correlate with a known geo-political zone, locality, or country, such as black-out zone 304. Therefore, if there has been fraud on a user account, localized account freeze device 118 may locally unfreeze electronic transactions corresponding to black-out zone 304 thereby allowing the user to continue making electronic transactions while freezing the user's account for electronic transactions outside the determined black-out zone 304.

In some embodiments, black-out zone 304 may correspond to a country or locality where fraud data indicates one or more fraudsters frequently make electronic transactions. Localized account freeze device 118 may generate a pattern of fraud using fraud data 206A. In some embodiments, this pattern of fraud may correlate with a known geo-political zone, locality, or country, such as black-out zone 304. Therefore, if there has been fraud on a user account, localized account freeze device 118 may locally freeze electronic transactions corresponding to black-out zone 304 thereby allowing the user to continue making electronic transactions while freezing their account for electronic transactions inside the determined black-out zone 304.

Figure 4A:
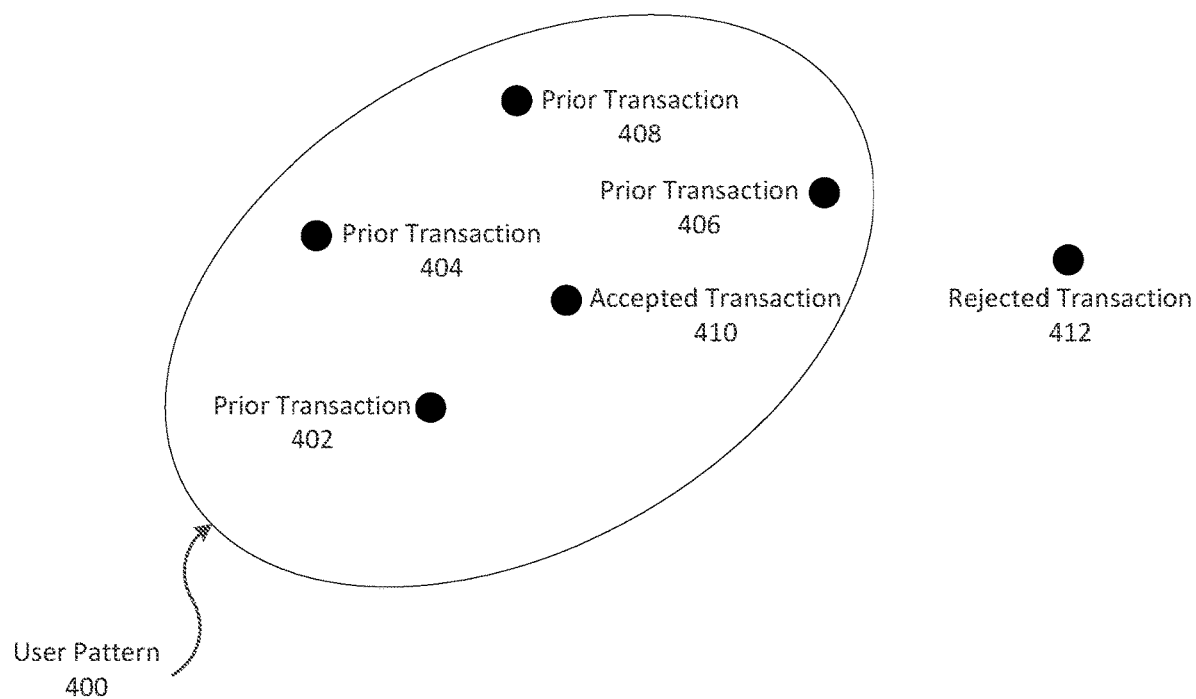
FIG. 4A depicts authorization of electronic transactions based on a user pattern.

FIG. 4A depicts authorization of electronic transactions based on a user pattern. In some embodiments, localized account freeze device 118 may be configured to use user pattern 400 to discriminate between acceptable and unacceptable electronic transactions. For example, localized account freeze device 118 may be configured to provide an authorization indication for electronic transactions within user pattern 400 (e.g., accepted transaction 410). As an additional example, localized account freeze device 118 may be configured to deny authorization for electronic transactions outside of user pattern 400 (e.g., rejected transaction 412). For example, localized account freeze device 118 may be configured to not provide an authorization indication for such electronic transactions that are outside of user pattern 400. As a further example, localized account freeze device 118 may be configured to provide a denial-of-authorization indication for such electronic transactions. In some aspects, the authorization indication may comprise an affirmation of authorization. In some aspects, the authorization indication may comprise a denial-of-authorization indication. In some aspects, failure to provide an affirmation of authorization, for example within a period of time, may comprise a denial-of-authorization indication. In some embodiments, the electronic transaction may proceed based on the authorization indication, according to systems and methods for settling electronic transactions known to one of skill in the art.

As shown in FIG. 4A, user pattern 400 is associated with prior transactions 402, 404, 406, and 408 which may be based on account data 206B associated with user device 104 and user 102. More particularly, in some embodiments, user pattern 400 may be generated based on prior transactions 402, 404, 406, and 408 and account data 206B.

In some embodiments, prior transactions 402, 404, 406, and 408 may be transactions associated with a user other than user 102 and a device other than user device 104. For example, in situations in which there is sparse data for prior user transactions, localized account freeze device 118 may use data from similar users to compile prior transactions 402, 404, 406, and 408.

Figure 4B:
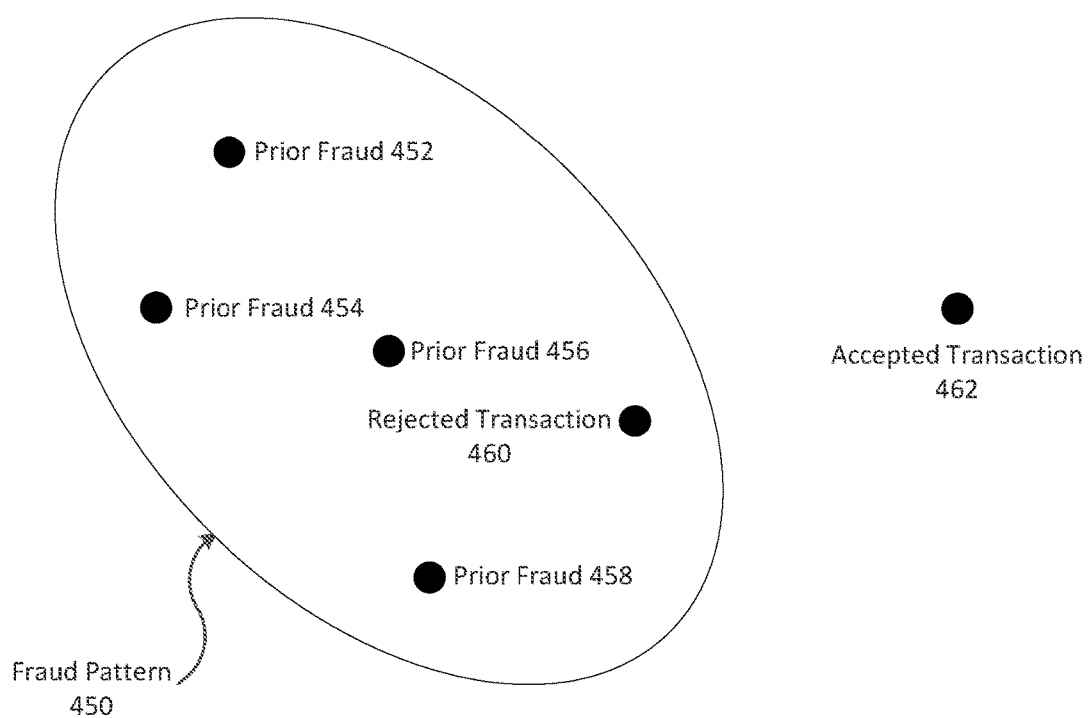
FIG. 4B depicts authorization of electronic transactions based on a fraud pattern.

FIG. 4B depicts authorization of electronic transactions based on a fraud pattern. In some embodiments, localized account freeze device 118 may be configured to use fraud pattern 450 to discriminate between acceptable and unacceptable electronic transactions. For example, localized account freeze device 118 may be configured to provide an authorization indication for electronic transactions outside fraud pattern 450 (e.g., accepted transaction 462). As an additional example, localized account freeze device 118 may be configured to deny authorization for electronic transactions within fraud pattern 450 (e.g., rejected transaction 460). For example, localized account freeze device 118 may be configured to not provide an authorization indication for such electronic transactions. As a further example, localized account freeze device 118 may be configured to provide a denial-of-authorization indication for such electronic transactions.

As shown in FIG. 4B, fraud pattern 450 is associated with prior fraudulent transactions 452, 454, 456, and 458 which may be based on fraud data 206A associated with fraud device 108 and fraudster 106. More particularly, in some embodiments, fraud pattern 450 may be generated based on prior fraudulent transactions 452, 454, 456, and 458 and fraud data 206A.

In some embodiments, prior fraudulent transactions 452, 454, 456, and 458 may be transactions associated with a fraudster other than fraudster 106 and a device other than fraudster device 108. For example, localized account freeze device 118 may use prior fraudulent transactions on other user accounts to compile prior fraudulent transactions 452, 454, 456, and 458.

Figure 5:
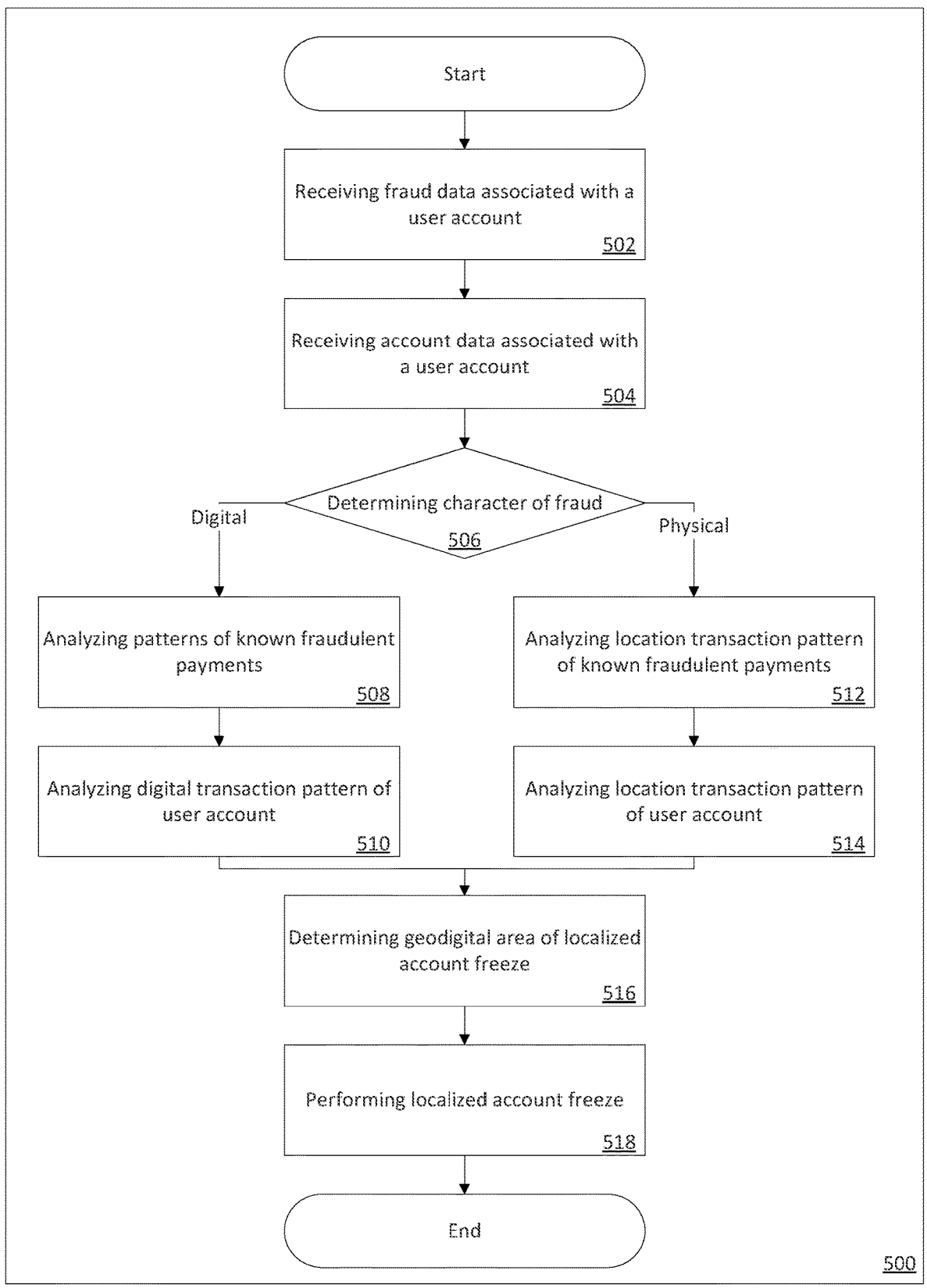
FIG. 5 depicts a flowchart illustrating a process for localized account freeze when detecting a fraudulent transaction.

FIG. 5 depicts a flowchart illustrating a process for localized account freeze when detecting a fraudulent transaction. In some aspects, localized account freeze device 118 may be configured to receive fraud data associated with a user account. Localized account freeze device 118 may be configured to then determine whether the character of fraud is digital or physical.

In some aspects, if the character of the fraud is determined to be physical, localized account freeze device 118 may be configured to analyze patterns of known fraudulent payments. Localized account freeze device 118 may be configured to then analyze a digital transaction pattern of the user account associated with the fraudulent activity.

Alternatively, if the character of the fraud is determined to be physical, localized account freeze device 118 may be configured to analyze location transaction patterns of known fraudulent payments. Localized account freeze device 118 may be configured to then analyze location transaction pattern of a user account associated with the fraudulent activity.

In various aspects, localized account freeze device 118 may be configured to determine a geodigital area for a localized account freeze. Localized account freeze device 118 may be configured to then perform the localized account freeze on the determine geodigital area.

In step 502, localized account freeze device 118 receives fraud data associated with a user account. For example, localized account freeze device 118 may receive fraud data from a financial service provider system such as financial service provider system 116. In some embodiments, localized account freeze device 118 may receive fraud data from a device not specifically designated, such as from an authorization device or server. In some embodiments, prior fraud data may be stored in localized account freeze device 118 in memory 206 and sent to processor 202 for use in future steps.

In step 504, localized account freeze device 118 receives account data associated with the user account. For example, localized account freeze device 118 may receive account data from a financial service provider system such as financial service provider system 116. In some embodiments, localized account freeze device 118 may receive account data from a device not specifically designated, such as from an authorization device or server. In some embodiments, account data may be stored in localized account freeze device 118 in memory 206 and sent to processor 202 for use in future steps.

In step 506, localized account freeze device 118 determines the character of the fraud. For example, localized account freeze device 118 may determine that the transaction which was marked as fraudulent was conducted online, in which case the fraud would be determined to be digital fraud. In other embodiments, localized account freeze device 118 may determine that the transaction which was marked as fraudulent was conducted in person at a determined location, in which case the fraud would be determined to be physical fraud. However, these two possibilities may not be mutually exclusive. For example, the transaction which was marked as fraudulent could have been conducted online but associated with an Internet Protocol (IP) address which is associated with a physical location. In these situations, localized account freeze device 118 may be configured to determine that the fraud is both digital and physical and proceed accordingly.

In step 508, if the character of fraud is determined to be digital, localized account freeze device 118 may analyze patterns of known fraudulent payments. For example, localized account freeze device 118 may analyze the fraud data received in step 502 to determine a fraud pattern. In some embodiments, the fraud pattern may comprise certain types of transactions associated with fraud and transactions made on certain websites associated with fraud.

In some embodiments, a neural network may be used to apply machine learning principles to analyze the fraud data to determine a fraud pattern. Many different machine learning algorithms may be applied to determine a pattern associated with a set of data, such as the fraud data. For example, backpropagation, k-nearest neighbor grouping, reinforcement learning, support vector machines, and a variety or combination of other machine learning algorithms may be used to determine a pattern from a set of data.

In some embodiments, processor 202 may run one or more machine learning algorithms to determine a pattern associated with a set of data.

In step 510, if the character of fraud is determined to be digital, localized account freeze device 118 may analyze the digital transaction pattern of the user account. For example, localized account freeze device 118 may analyze the account data received in step 504 to determine a digital transaction pattern of the user account. In some embodiments, the digital transaction pattern of the user account may comprise types of transactions the user has made in the past and past transactions made by the user on certain web sites.

In some embodiments, such as when prior account data associated with the user account is sparse, localized account freeze device 118 may also use account data associated with other user accounts with similar transaction patterns.

In some embodiments, a neural network may be used to apply machine learning principles to analyze the account data to determine a user pattern. Any of the various machine learning algorithms mentioned above may be applied to determine a pattern associated with data corresponding to account usage by the user.

In step 512, if the character of fraud is determined to be physical, localized account freeze device 118 may analyze location transaction patterns of known fraudulent payments. For example, localized account freeze device 118 may analyze the fraud data received in step 502 to determine a physical location associated with fraud. In some embodiments, the physical location may be a municipality, state, country, or other geographical area where prior fraudulent transactions have previously occurred.

In some embodiments, a neural network may be used to apply machine learning principles to analyze the fraud data to determine a fraud pattern. Any of the various machine learning algorithms mentioned above may be applied to determine a pattern associated with data corresponding to physical locations where fraud has occurred.

In step 514, if the character of fraud is determined to be physical, localized account freeze device 118 may analyze location transaction patterns of the user account. For example, localized account freeze device 118 may analyze the account data received in step 504 to determine a physical location associated with nonfraudulent transaction on the user account. In some embodiments, the physical location may be a municipality, state, country, or other geographical area where prior nonfraudulent transactions have frequently occurred.

In some embodiments, a neural network may be used to apply machine learning principles to analyze the account data to determine a user pattern. Any of the various machine learning algorithms mentioned above may be applied to determine a pattern associated with data corresponding to account usage by the user.

In some embodiments, such as when prior account data associated with the user account is sparse, localized account freeze device 118 may also use account data associated with other user accounts with similar transaction patterns.

In step 516, localized account freeze device 118 may determine a geodigital area of a localized account freeze. For example, localized account freeze device 118 may determine that fraud data is associated only with certain geographical areas and certain transactions and websites. Therefore, the geodigital area would comprise the geographical area as well as certain electronic transaction types and transactions from certain websites. In some embodiments, the geodigital area may only comprise a geographical area. In other embodiments, the geodigital area may only comprise a digital area corresponding with certain electronic transactions and websites. In still other embodiments, the geodigital area may comprise some combination of a geographical area and a digital area.

In step 518, localized account freeze device 118 may perform a localized account freeze. For example, localized account freeze device 118 may perform an account freeze on the geodigital area determined in step 516. The account freeze would prevent further fraudulent transactions occurring in the determined fraudulent geodigital area associated with fraud or would prevent fraudulent transaction occurring outside the determined geodigital area associated with non-fraudulent transactions on the user account.

The disclosed embodiments provide a specific way to locally freeze a user account in a geographical or digital space by using known fraud data and account data. These patterns may be used to authorize electronic transactions, reducing the cost of fraudulent electronic transactions. These systems and methods may benefit from improved performance over simple, conventional models, and may allow the beneficial use of immense amounts of currently unused, unlabeled fraud data and account data. These systems and methods may also benefit a user by allowing them to continue their regular use on their account. Therefore, the localized freezing of a user account in a geographic or digital space represents an innovative, technical improvement to electronic transaction authorization infrastructure that is not routine or conventional in the field of electronic transaction authorization.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for locally freezing accounts in geographic or digital spaces based on detected patterns comprising:
   at least one processor; and
   at least one non-transitory computer readable medium containing instructions that, when executed by the at least one processor, cause the at least one processor to perform operations comprising:
      detecting fraud data associated with a first user account, wherein the fraud data includes a location where a fraud associated with the first user account has occurred, and wherein the location comprises at least one of a digital location or a geographical location;
      generating a pattern of fraud based on the fraud data;
      determining a geodigital area for a localized account freeze based on the pattern of fraud;
      retrieving a pattern of use associated with a second user account;
      performing a first localized account freeze on the first user account in the geodigital area based on the pattern of fraud; and
      performing a second localized account freeze on the second user account in the geodigital area based on the pattern of use.

2. A method for locally freezing accounts in geographic or digital spaces based on detected patterns, the method comprising:
   detecting fraud data associated with a first user account, wherein the fraud data includes a location where a fraud associated with the first user account has occurred, and wherein the location comprises at least one of a digital location or a geographical location;
   generating a pattern of fraud based on the fraud data;
   determining a geodigital area for a localized account freeze based on the pattern of fraud;
   retrieving a pattern of use associated with a second user account;
   performing a first localized account freeze on the first user account in the geodigital area based on the pattern of fraud; and
   performing a second localized account freeze on the second user account in the geodigital area based on the pattern of use.

3. The method of claim 2, wherein detecting the fraud data further comprises:
   detecting a previous transaction associated with a third user account; and
   storing the previous transaction.

4. The method of claim 2, wherein the geodigital area for the localized account freeze comprises a geographical area.

5. The method of claim 2, wherein the geodigital area for the localized account freeze comprises one or more websites.

6. The method of claim 2, further comprising:
   determining one or more additional user accounts associated with the first user account; and
   performing an additional localized account freeze on the one or more additional user accounts.

7. The method of claim 2, further comprises;
   receiving account data associated with the second user account, the account data including non-fraudulent account transaction information; and
   determining the pattern of use associated with the second user account based on the account data.

8. The method of claim 7, wherein determining the geodigital area for the localized account freeze comprises determining a square mile radius around the geographical location of the fraud for the localized account freeze.

9. The method of claim 2, wherein determining the geodigital area for the localized account freeze comprises determining one or more websites associated with the fraud data.

10. The method of claim 2, wherein generating the pattern of fraud includes analyzing the fraud data using a machine learning model to determine the pattern of fraud.

11. The method of claim 10, wherein the machine learning model is an unsupervised clustering machine learning model.

12. The method of claim 10, wherein the machine learning model is a supervised classification machine learning model.

13. An authorization server comprising:
    at least one processor; and
    at least one non-transitory computer readable medium containing instructions that when executed by the at least one processor, cause the authorization server to perform operations comprising:
       detecting fraud data associated with a first user account, wherein the fraud data includes a location where a fraud associated with the first user account has occurred, and wherein the location comprises at least one of a digital location or a geographical location;

generating a pattern of fraud based on the fraud data;
determining a geodigital area for a localized account freeze based on the pattern of fraud;
retrieving a pattern of use associated with a second user account;
performing a first localized account freeze on the first user account in the geodigital area based on the pattern of fraud; and
performing a second localized account freeze on the second user account in the geodigital area based on the pattern of use.

14. The authorization server of claim 13, wherein detecting the fraud data further comprises:
   detecting a previous transaction associated with a third user account; and
   storing the previous transaction.

15. The authorization server of claim 13, wherein the geodigital area for the localized account freeze comprises a geographical area.

16. The authorization server of claim 13, wherein the geodigital area for the localized account freeze comprises one or more websites.

17. The authorization server of claim 13, wherein the operations further comprising:
   determining one or more additional user accounts associated with the first user account; and
   performing an additional localized account freeze on the one or more additional user accounts.

18. The authorization server of claim 13, wherein the operations further comprising:
   receiving account data associated with the second user account, the account data including non-fraudulent account transaction information; and
   determining the pattern of use associated with the second user account based on the account data.

19. The authorization server of claim 18, wherein determining the geodigital area for the localized account freeze comprises determining a square mile radius around the geographical location of the fraud for the localized account freeze.

20. The authorization server of claim 13, wherein determining the geodigital area for the localized account freeze comprises determining one or more websites associated with the fraud data.

* * * * *